Figure 1:
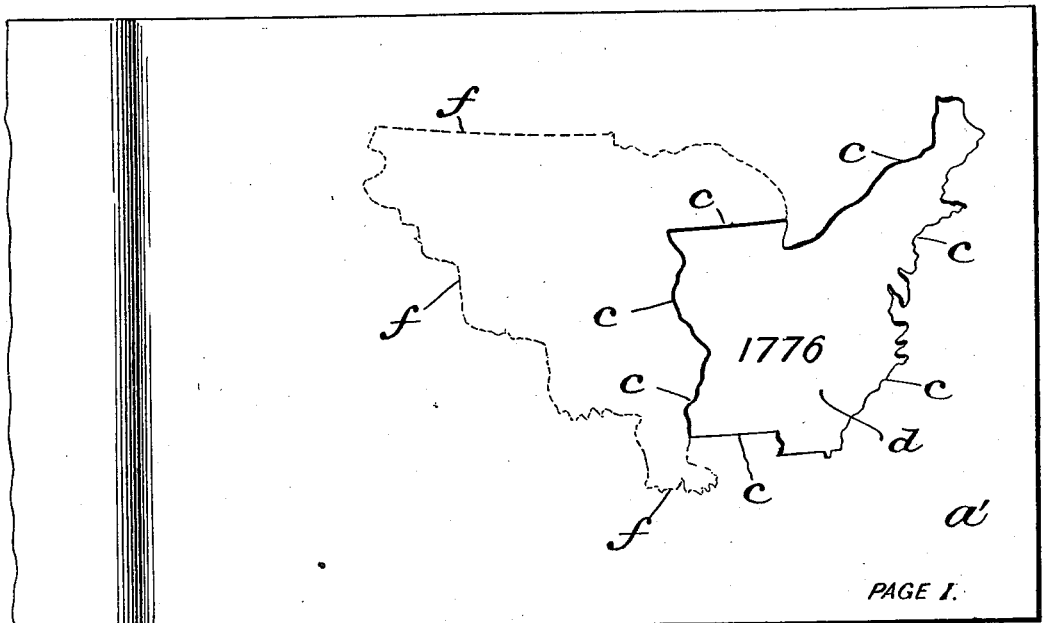

No. 730,859. PATENTED JUNE 16, 1903.
O. P. AUSTIN.
EDUCATIONAL APPLIANCE.
APPLICATION FILED APR. 17, 1903.
NO MODEL. 3 SHEETS—SHEET 1.

Witnesses:
J. E. Hutchinson Jr.
E. C. Shuermann.

Inventor:
O. P. Austin.
By his atty,
J. H. Geasborough

No. 730,859. PATENTED JUNE 16, 1903.
O. P. AUSTIN.
EDUCATIONAL APPLIANCE.
APPLICATION FILED APR. 17, 1903.
NO MODEL. 3 SHEETS—SHEET 2.

Witnesses:
J. E. Hutchinson Jr.
E. C. Schuermann.

Inventor:
O. P. Austin.
By his atty
J. H. Goldsborough

No. 730,859. PATENTED JUNE 16, 1903.
O. P. AUSTIN.
EDUCATIONAL APPLIANCE.
APPLICATION FILED APR. 17, 1903.
NO MODEL. 3 SHEETS—SHEET 3.
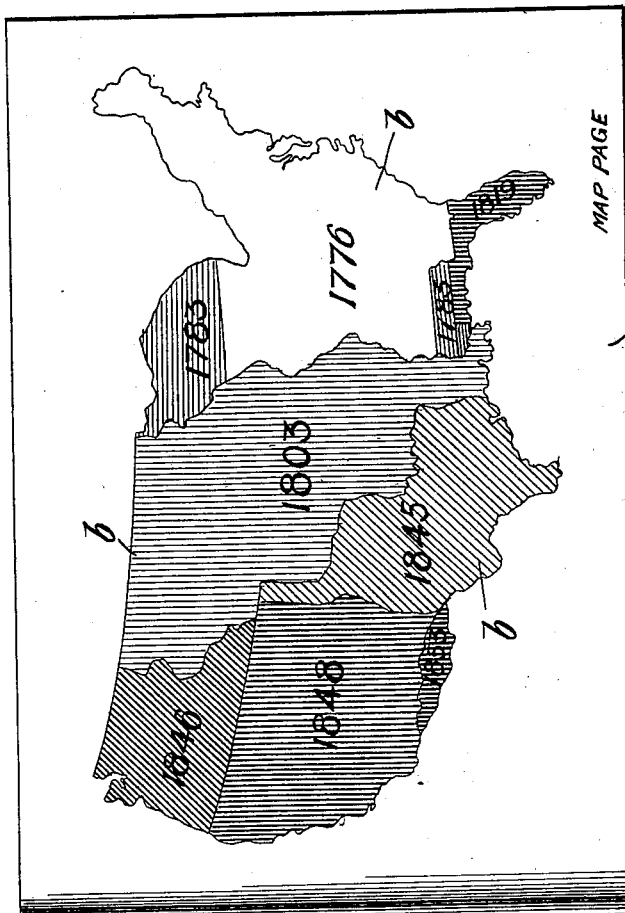
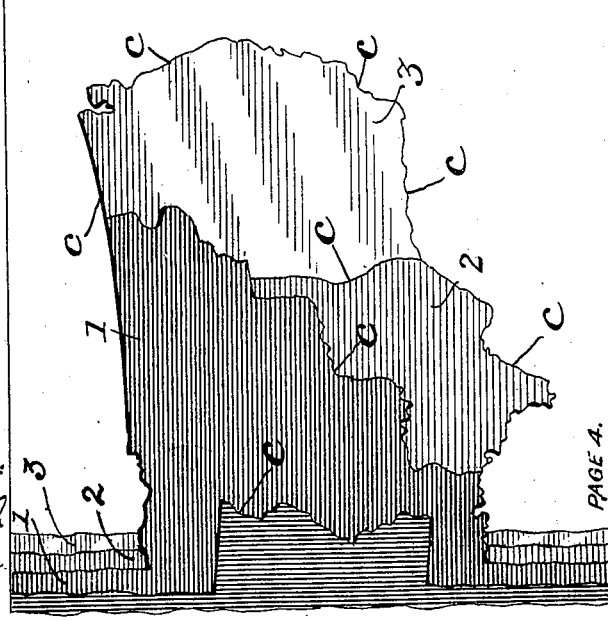
Witnesses:
J. E. Hutchinson
E. C. Schuermann
Inventor:
O. P. Austin.
By his atty
J. H. Goldsborough No. 730,859.

Patented June 16, 1903.

UNITED STATES PATENT OFFICE.

OSCAR P. AUSTIN, OF WASHINGTON, DISTRICT OF COLUMBIA.

EDUCATIONAL APPLIANCE.

SPECIFICATION forming part of Letters Patent No. 730,859, dated June 16, 1903.

Application filed April 17, 1903. Serial No. 153,076. (No model.)

*To all whom it may concern:*

Be it known that I, OSCAR P. AUSTIN, a citizen of the United States, residing at Washington, in the District of Columbia, have invented certain new and useful Improvements in Educational Appliances; and I do hereby declare the following to be a full, clear, and exact description of the invention, such as will enable others skilled in the art to which it appertains to make and use the same.

The purpose of the invention is to provide an improved educational map, chart, or other graphic representation of any object whose growth or expansion it is desired to illustrate; and the invention consists in a series of leaves, pages, or sheets having a graphic, pictorial, or conventional representation of the completed object on the last leaf and all the other leaves being provided with openings or cut-away portions of varying contour and extent, so as to expose through said openings different portions of the completed thing shown beneath corresponding to the extent, shape, and outline thereof at different periods of time.

The invention is particularly adapted for the use of teachers, lecturers, or other instructors; and, as herein illustrated, it consists of a map of the United States combined with a number of the aforesaid cut-away leaves so as to show the original outline of the country and successive acquisitions of territory down to a comparatively recent period.

Although the present embodiment of the invention is a map illustrating only the United States, it is to be understood that the same principle or plan of illustration may be applied to any country, state, or territory, or, indeed, to any object or thing where it is desired to illustrate its growth or expansion or to show its contour or extent at any particular period.

It is immaterial, of course, how many and what periods are selected, and the number of the cut-away leaves will naturally vary with the subject of the illustration without departing from the spirit or scope of the invention. It is also immaterial whether the cut-away leaves be in the form of loose sheets or whether they be bound in book form with the leaf, page, or sheet containing the map.

The present embodiment of the invention is illustrated in the accompanying drawings, forming part of this specification.

Figure 2:
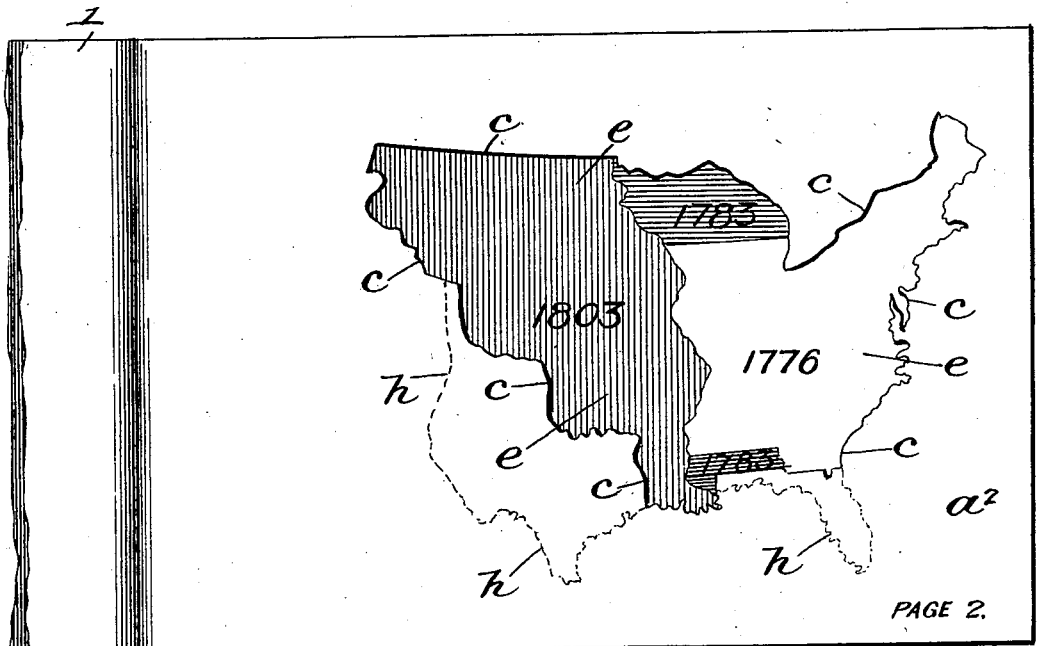
Figure 3:
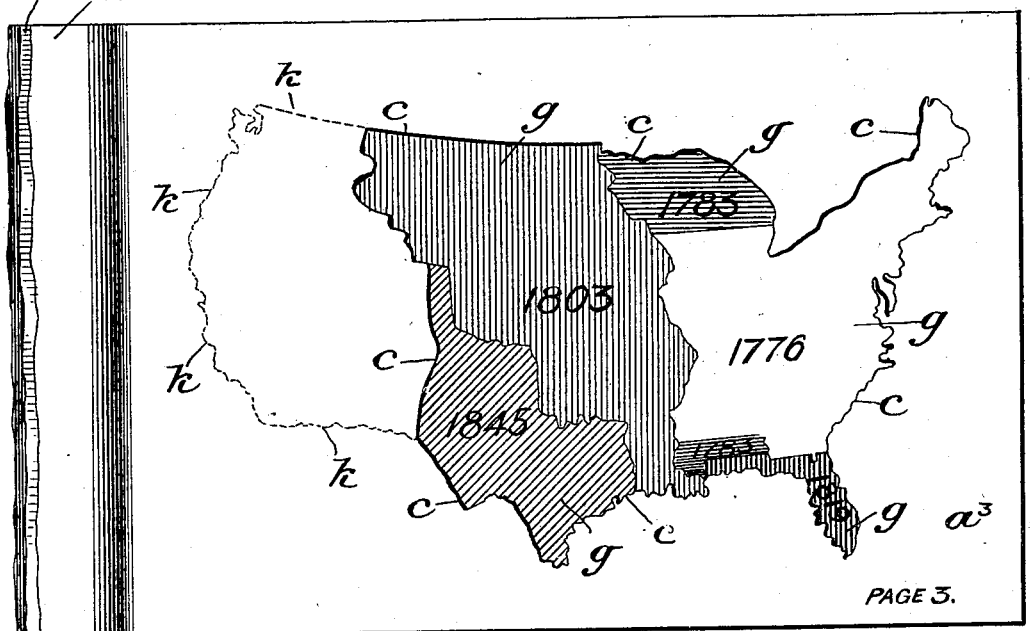
Figure 4:
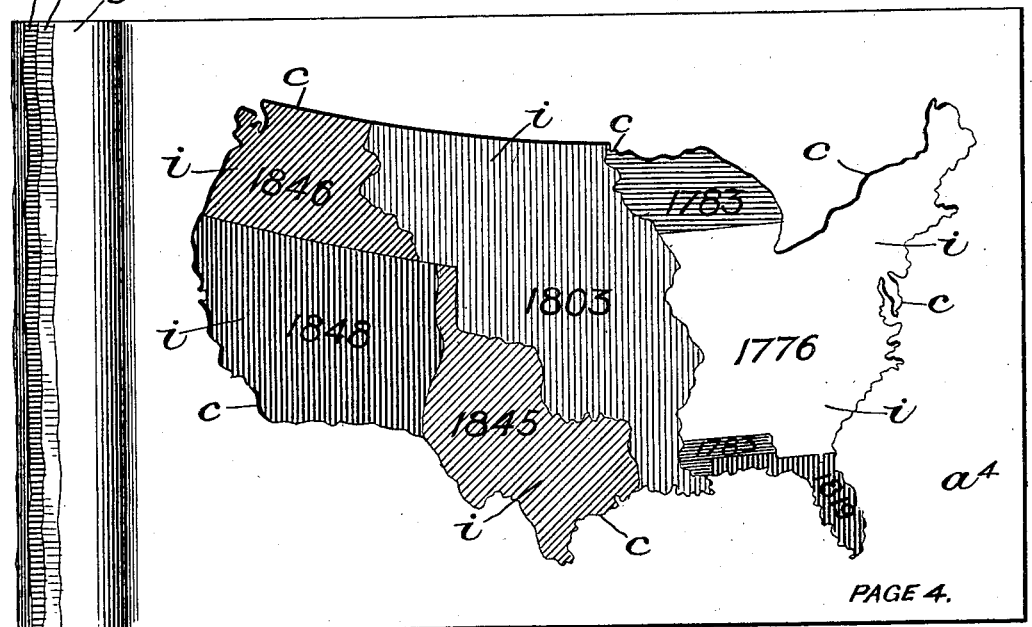

In the drawings, Figure 1 is a plan view of the front of the first leaf or page. Fig. 2 is a similar view of page 2. Figs. 3 and 4 are similar views of pages 3 and 4. Fig. 5 is a similar view of the front of the last page and showing also part of the rear or reverse side of page 4.

Referring to the views, $a$ denotes a leaf, page, or sheet, whereon is printed or otherwise depicted a map $b$ of the United States. As here shown, this map does not indicate the states and territories composing the Union, but is a mere outline map, excepting only as to the various tracts which have been added from time to time to the original thirteen colonies. As to these acquisitions the boundaries are indicated in the usual way, and each is preferably conspicuously marked with figures denoting the year in which it was acquired, or it might be identified by descriptive words or in any other suitable manner. It is not pretended that this map shows the whole of the United States as it now exists; but sufficient of the country is shown to illustrate the present invention, and the parts that have been omitted (Alaska and the insular possessions) have been left out merely for the purpose of compacting the illustration.

Although the present map shows the country as divided up only into such tracts as have been added to the original territory, it might of course be made to show the boundaries of any or all of the States and Territories.

As will be understood from the drawings and the previous description the sheet $a$ upon which the map $b$ is printed is the last one of a series of sheets that are shown as bound together in book form. The other sheets of the series are denoted by $a'$, $a^2$, $a^3$, and $a^4$, respectively, and each has that part which overlies the map cut out or provided with an opening, the outline or contour of which is indicated at $c$. These openings or cut-away portions vary in extent and contour from the first page toward the map, as clearly shown in the drawings.

The opening in the first page $a'$ is shown at $d$, Fig. 1, the outline of the opening being clearly denoted by solid lines. The shape, contour, and extent of this opening correspond exactly to the geographical boundaries of the thirteen original colonies, and when this page covers the map only that part of the United States comprised within these thirteen colonies will be exposed, the remaining territory being covered and concealed by the solid uncut portion of said first page. It will of course be understood that the opening in this first page is smaller than the opening in any of the other pages, this being intended only to expose the original extent of the country. The openings in the other pages increase in size, corresponding exactly to the rate of increase or expansion of the country, all, however, being larger than the opening in page 1 and none of the openings in the underlying pages covering or interfering in any way with a clear view of the map through the opening in the first page.

The opening in the second page $a^2$ is shown at $e$, Fig. 2, and its outline is also indicated through page 1 by the dotted outline $f$. This page is intended to show the territorial expansion of the country between the years 1776 and 1804, and the opening $e$ exposes, in addition to what was shown by opening $d$ in page 1, the acquisition of 1803, known as the "Louisiana purchase," and the minor acquisitions of 1783.

The opening in the third page $a^3$ is shown at $g$, Fig. 3, and its outline is indicated also on page 2 by the dotted line $h$. This page (3) illustrates through the opening the increase in the territory of the country between the years 1804 and 1846, and the opening $g$ exposes the acquisitions of 1819 (Florida) and 1845 (Texas) in addition to that part of the map shown through the opening $e$ of page 2.

Page 4 is cut away or provided with an opening $i$, the outlines of which are also shown through the solid part of page 3 by the dotted lines $k$. This page (4) shows the contour and extent of the country after the acquisition of Oregon in 1846 and California and New Mexico in 1848.

Such being the construction and manner of using my improved map, it is to be noted that each page or sheet exposes only so much of the map as represents the extent and outline of the country at a particular date and that a comparison of any two or more pages will indicate at a glance the particular territory added between the dates represented by such pages. It is also to be noted that the openings in the pages overlying the map-page occupy only a portion of such pages, and I prefer to make the pages of such size compared with the openings as to provide room on any or all of them for letter-press description of the country or thing which is illustrated on the map beneath.

Having now particularly described my invention, what I claim is—

1. A map, chart, or similar graphic representation indicating the growth or expansion of a country or other object, the same comprising a leaf, page, or sheet, having thereon an outline or other map or representation of the completed country or thing, and a series of overlying leaves, pages, or sheets having openings or cut-away portions of varying contour and extent to expose different portions of the representation beneath.

2. A map, chart, or similar graphic representation indicating the growth or expansion of a country or other object, the same consisting of a series of leaves, pages, or sheets, the last leaf containing an outline or other map or representation of the completed country or thing, and the overlying leaves having openings or cut-away portions of varying contour and extent, the variation in the contour and extent of said openings progressing from the first leaf toward the last, so that successive leaves will expose successive acquisitions or additions to the thing represented as a whole on the last leaf.

In testimony whereof I affix my signature in presence of two witnesses.

OSCAR P. AUSTIN.

Witnesses:
J. A. GOLDSBOROUGH,
EDWIN S. CLARKSON.